Jan. 3, 1956      W. H. SMITH      2,729,264
APPARATUS FOR THE MANUFACTURE OF SUPPORT
MEMBERS FROM SHEET METAL

Filed Nov. 27, 1951      3 Sheets-Sheet 1

INVENTOR
WILLIAM H. SMITH
BY *[signature]*
Atty.

INVENTOR
WILLIAM H. SMITH

Jan. 3, 1956

W. H. SMITH 2,729,264

APPARATUS FOR THE MANUFACTURE OF SUPPORT
MEMBERS FROM SHEET METAL

Filed Nov. 27, 1951

INVENTOR

WILLIAM H. SMITH

BY *Jw Emirie*

Atty.

United States Patent Office 2,729,264
Patented Jan. 3, 1956

2,729,264
APPARATUS FOR THE MANUFACTURE OF SUPPORT MEMBERS FROM SHEET METAL

William Herbert Smith, East Molesey, England

Application November 27, 1951, Serial No. 258,466

7 Claims. (Cl. 153—3)

This invention relates to improvements in centering, scaffolding and similar supports used in building, and is directed towards an improved method and apparatus for manufacturing extensible supports from sheet metal.

The supports to which the invention relates are made of sheet metal and examples of them are described in British patent specification No. 378,475.

In accordance with the present invention, a blank of sheet metal of appropriate gauge and of channel section is placed upon a machine bed, an expandable mandrel of the shape of the centering member is placed inside the channel section, and pivoted bending members then fold the sides over to contact with the mandrel; the edges being then brought to final shape by rollers which run longitudinally to the support.

In the preferred form of the apparatus, the expanding mandrel has base members at each side adapted to slide towards and away from each other and has a top portion which can be raised and lowered by a rack-and-pinion-operated bar having a series of inclines on its upper edge. The mandrel is preferably pivoted at one end and is tilted about this pivot by a plunger.

In the accompanying drawings, which illustrate a preferred method and one form of apparatus for manufacturing the centre members of extensible supports of substantially triangular cross section.

Figure 1:
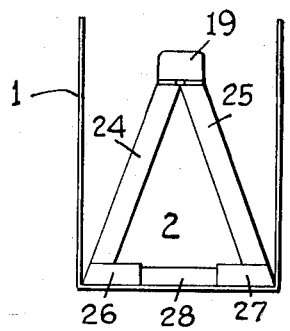
Fig. 1 is a diagrammatic end view in elevation of a mandrel in operative relation to a channel shaped blank in accordance with the present invention.
Figure 2:
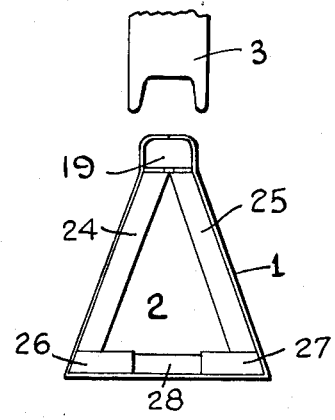
Fig. 2 is a view similar to Fig. 1 but including a fragmentary portion of a swaging element and showing the support formed from the blank.

Referring first to Figs. 1 and 2 sheet metal blanks 1 of channel section are fed on to the bed of the machine under the expandable mandrel 2 which is then lowered by hydraulic rams and presses the blank against the bed of the machine; the mandrel is then expanded to the shape shown.

Bending arms, pivoted at their corners, are then moved to press the sides of the blanks against the sides of the mandrel 2.

Swaging or bending rollers 3 then pass along the machine and bend the top of the blank 1 against the top of the mandrel 2 to make a butt joint, the edges of which are then gas-welded together.

Figure 4:
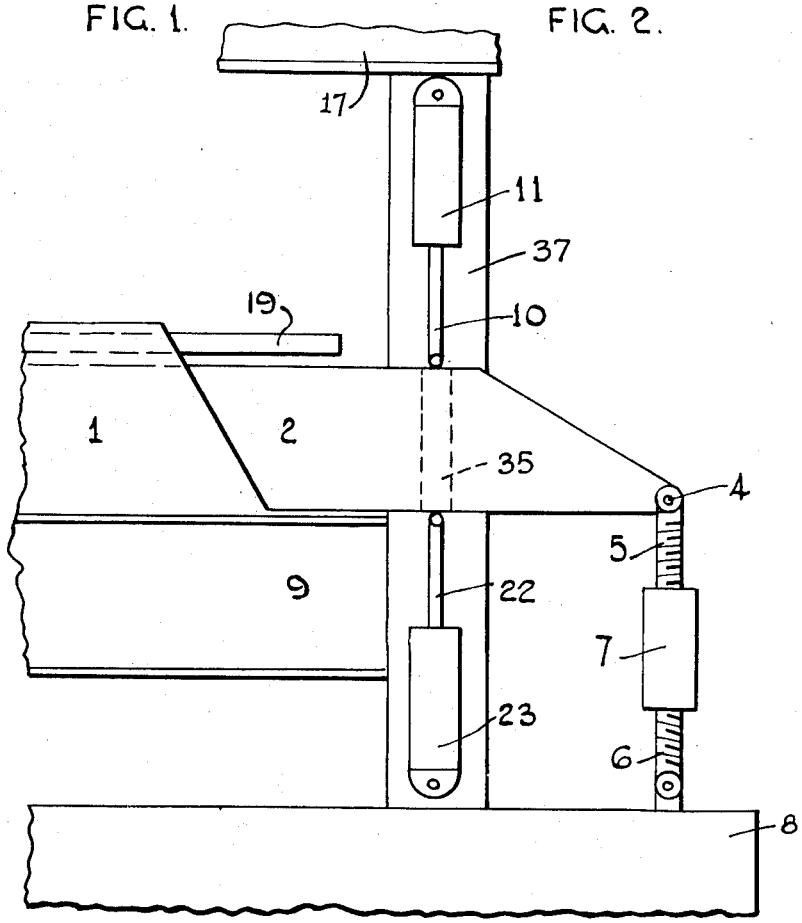
Fig. 4 is a diagrammatic fragmentary side view in elevation of one end of the apparatus.
Figure 3:
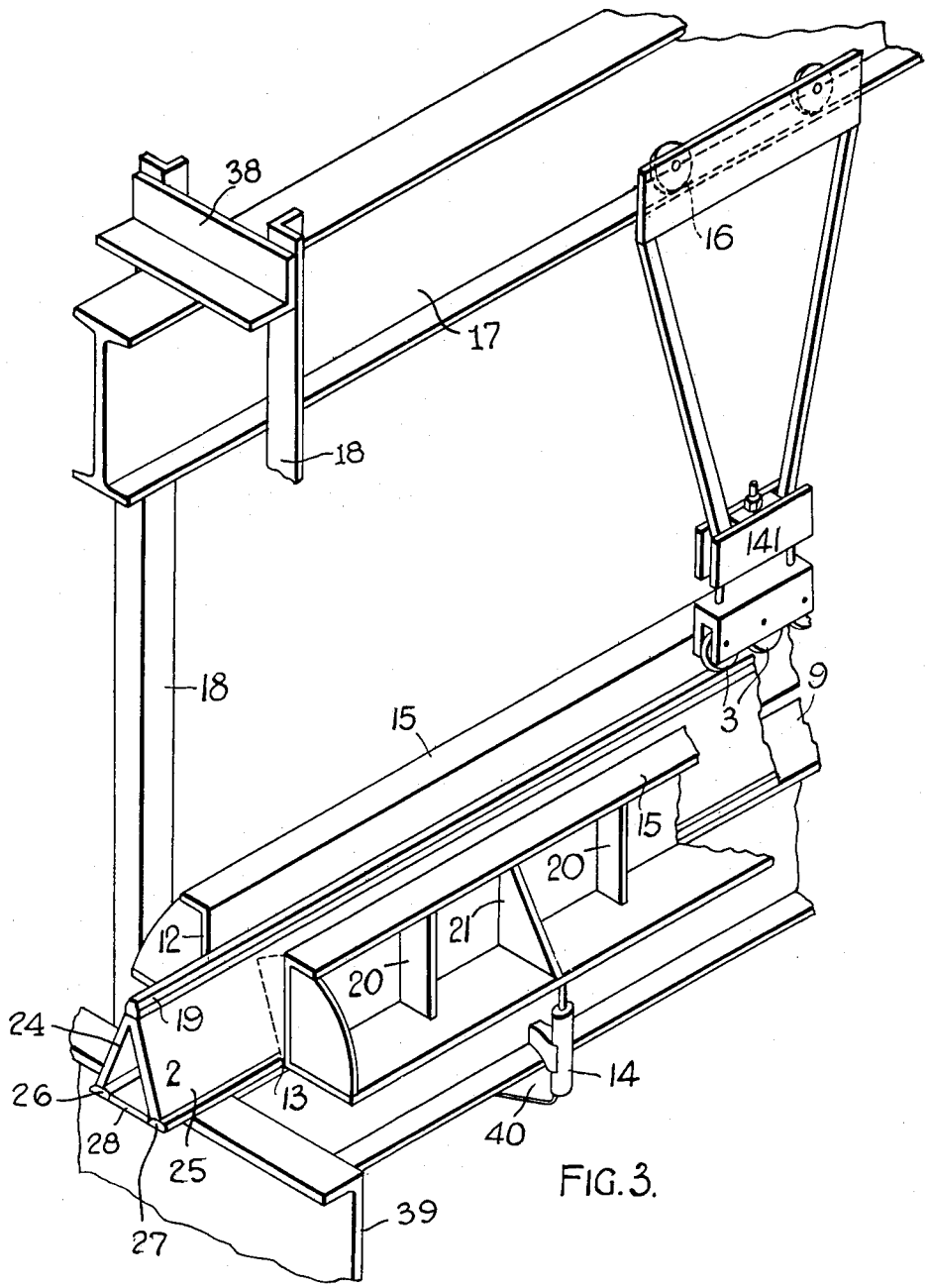
Fig. 3 is a fragmentary view in perspective of one end of an apparatus for manufacturing support members in accordance with the invention.

Referring now to Figs. 3 and 4, the mandrel 2 is supported at one end on a hingle 4 adjustable by right and left hand screws 5, 6 and turnbuckles 7 supported from a base member 8.

The mandrel 2 comprises strong side members 24, 25 inclined to one another to meet near the apex of a triangle, and rigidly fixed to triangular members 35 spaced at intervals along the length of the mandrel. At the bottom end of these side members 24, 25 are mounted lower parts 26, 27 (forming the base of the triangle) which are capable of movement outwards relatively to the side members. A base guide 28, tapering longitudinally is movable longitudinally to force the members 26, 27 apart against the resistance of a spring 29.

Figure 5:
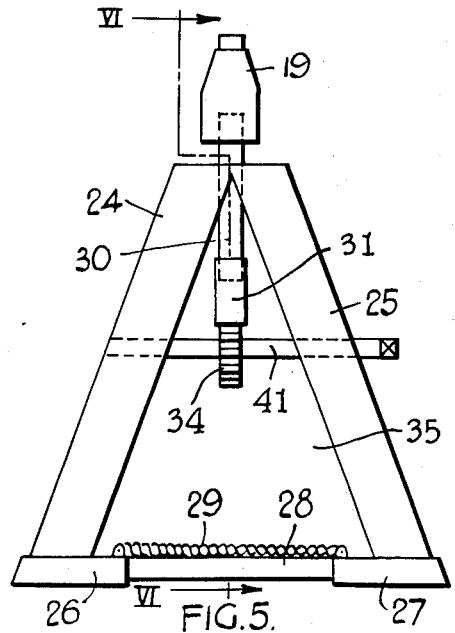
Fig. 5 is an end view in elevation of an expandable mandrel.
Figure 6:
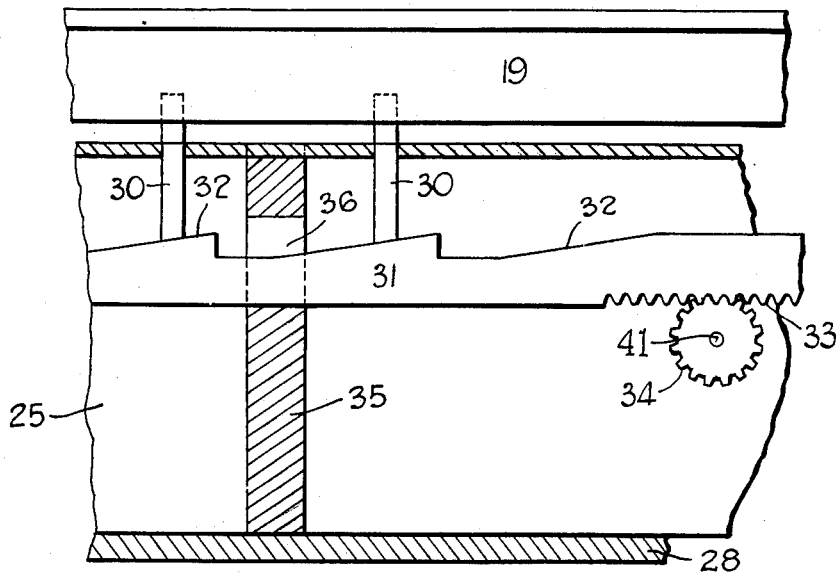
Fig. 6 is a cross-sectional view taken on line VI—VI of Fig. 5.

The top member 19 of the mandrel has, depending from it at intervals, pins 30, Figs. 5, 6 passing through holes in the integrally joined top ends of the side members 24, 25 and bearing upon a bar 31 having a series of inclines 32 on its top. The bar 31 passes through apertures 36 in the triangular members 35.

This bar 31 has a rack 33 on its underside in engagement with a pinion 34 mounted on a transverse shaft 41 which extends between the side members 24, 25. This shaft extends to the outside of the mandrel so that it can be rotated by a handle or spanner applied to its ends. On operation of this pinion from the expanded position shown, the bar 31 moves to the left, so that the pins 30 move relatively down the inclines 32 and the top member 19 of the mandrel 2 falls and comes clear of the complete support member. On rotation of the pinion 34 in the opposite (anticlockwise) direction, the pins 30 and top member 19 are raised to expand the mandrel.

On the base plate 8 of the machine are fixed vertical posts 18, 37 arranged in pairs each pair of posts being spanned at their top ends by a short horizontal crossbeam such as 38. The bed 9 is supported above the base 8 by an angle section 39 extending between the posts 18 at one end and is supported between the posts 37 at the other end. An upper beam 17 parallel to and vertically above the bed 9 extends between the vertical posts 18, 37 being suspended from the short cross beams 38.

At the beginning of the operation the mandrel is contracted and tilted upwards about the pivot pin 4.

The blank 1 is then threaded on to it and the mandrel 2 is lowered on to the bed 9 and the lower parts 26, 27 are then expanded; it is held down on the bed by rams 10 (one at each end of the machine) operated by hydraulic cylinders 11 supported by the posts 37.

Angle-shaped benders 12 (not shown in Fig. 4) pivoted at their corners 13 to the upper edges of the bed 9 are then tilted by hydraulic jacks 14 (one at each end of the machine) and bend the blank 1 into contact with the mandrel 2. The jacks 14 are supported from the bottom of the bed 9, being mounted on plates 40 projecting from the bed 9 so that the jacks engage the benders 12 remote from the pivots 13. A carriage 141 carrying rollers 3 then moves along the machine, having upper rollers 16 moving along the lower flange of an upper beam 17, supported from the base of the machine by posts 18.

These rollers swage or bend the projecting edges of the blank over the top member 19 of the mandrel 2.

The angle-shaped benders 12 have stiffening upper members 15 connected to the bottom leg at intervals by diaphragms 20, 21.

After the swaging operation the contacting edges of the otherwise completed support members are then welded.

The mandrel is then contracted and tilted upwards about the hinge 4 by a ram 22, Fig. 4 operated by an hydraulic cylinder 23, mounted on frame members 37, whereupon the completed support member is slid off the mandrel.

I claim:

1. Apparatus for the manufacture from sheet metal of extensible centering, scaffolding and similar support members of substantially triangular section, comprising a support, a mandrel mounted on said support for fitting within a sheet metal blank of channel section, said mandrel having a main body portion of substantially triangular section, an expandable base comprising parts movable outwardly relatively to each other and a top member which can be raised and lowered relatively to said base, means pivotally mounted on said support on opposite sides of said mandrel for bending the sides of said blank into contact with the sides of the body of said mandrel, swaging rollers, and means on said support and movably supporting said swaging rollers above said mandrel for running said rollers along the edges of the blank to bend the edge portions of the blank over said top member in its raised position.

2. Apparatus for the manufacture from sheet metal of extensible centering, scaffolding and similar support members of substantially triangular section, comprising a support having a bed, an expandable mandrel mounted on said support for fitting within a sheet metal blank of channel section, means on said support for clamping said mandrel to said bed with the web of said blank sandwiched between said bed and the base of said mandrel, means on the base of said mandrel movable outwardly into engagement with the flanges of said blank, side members pivoted to said bed on opposite sides of said mandrel about axes parallel to the length of said mandrel, means on said support for tiling said side members about their pivots to fold the blank flanges against the sides of the mandrel, swaging rollers, and means on said support and movably supporting said swaging rollers above said mandrel for running said swaging rollers along the edges of said blank to bend said edges together over the top of the mandrel.

3. Apparatus according to claim 2 in which said mandrel is pivoted at one end on said support and is clamped to said bed by hydraulic rams mounted on said support.

4. Apparatus for the manufacture from sheet metal of extensible centering, scaffolding and similar support members of substantially triangular section, comprising a support having a bed, a mandrel mounted on said support for fitting within a sheet metal blank of channel section, said mandrel comprising a main body portion of substantially triangular section, a base comprising parts movable outwardly relatively to each other and a top member movable relatively to said base, means on said mandrel for raising and lowering said top member, means on said support for clamping the mandrel to said bed, longitudinal folding members pivoted on opposite sides of said bed about axes parallel to the length of said mandrel, swaging rollers, and means on said support and movably supporting said swaging rollers above said mandrel for running said swaging rollers along said top member.

5. Apparatus according to claim 4 wherein said means for raising and lowering said top member comprises pins depending from said top member, a bar beneath said top member and having a series of inclined portions along its top edge, said pins resting on said top edge, and means for moving said bar longitudinally relatively to said top member to vary the elevation of said top member by engagement by said pins with said inclines.

6. Apparatus according to claim 4 wherein said means supporting said swaging rollers comprises a guide above and parallel to said mandrel, and a carriage movable along said guide, said swaging rollers depending from said carriage.

7. Apparatus according to claim 4 wherein said folding members are of angle section and are tiltable by hydraulic rams on said support.

References Cited in the file of this patent

UNITED STATES PATENTS

| | | |
|---|---|---|
| 407,530 | Irwin | July 23, 1889 |
| 430,265 | Briggs | June 17, 1890 |
| 430,266 | Briggs | June 17, 1890 |
| 460,947 | Clapp et al. | Oct. 13, 1891 |
| 492,775 | Bosley | Mar. 7, 1893 |
| 528,192 | Underdown | Oct. 30, 1894 |
| 559,714 | Kaiser | May 5, 1896 |
| 665,088 | Gould | Jan. 1, 1901 |
| 818,932 | Baxter | Apr. 24, 1906 |
| 2,225,187 | Stitt | Dec. 17, 1940 |
| 2,502,012 | Kinkead | Mar. 28, 1950 |
| 2,515,786 | Mitchell | July 18, 1950 |
| 2,557,346 | Green | June 19, 1951 |

FOREIGN PATENTS

| | | |
|---|---|---|
| 20,413 | France | Feb. 12, 1858 |
| 10,668 | Great Britain | May 9, 1902 |
| 711,546 | France | June 30, 1931 |
| 666,979 | Great Britain | Feb. 20, 1952 |